United States Patent [19]

Nims

[11] 3,888,118

[45] June 10, 1975

[54] METHOD AND APPARATUS FOR DETERMINING ROAD ROUGHNESS

[75] Inventor: Jerry R. Nims, Baraboo, Wis.

[73] Assignee: Soiltest, Inc., Evanston, Ill.

[22] Filed: Mar. 2, 1973

[21] Appl. No.: 337,544

[52] U.S. Cl. .................................... 73/105; 73/146
[51] Int. Cl. ............................................. G01b 5/28
[58] Field of Search ...... 73/146, 105; 33/1 PT, 1 N, 33/139

[56] References Cited
UNITED STATES PATENTS

| | | | |
|---|---|---|---|
| 2,854,753 | 10/1958 | Caparros | 33/139 |
| 2,993,200 | 7/1961 | Walker | 33/1 PT |
| 3,266,302 | 8/1966 | Spangler | 73/105 |

Primary Examiner—S. Clement Swisher
Assistant Examiner—Denis E. Corr
Attorney, Agent, or Firm—Lee and Smith

[57] ABSTRACT

An apparatus for translating deflections sensed in a road wearing surface into data indicative of road roughness including a means, such as a vehicle, traveling along the surface to sense the deflections, a transducer assembly for translating the deflections sensed to electrical signals, means for tabulating and accumulating the data contained in such signals and means for controlling the operation of the apparatus. The transducer assembly having a shaft mounted on a sprung portion of the vehicle and connected through resilient means to an unsprung portion, which is moved by each deflection to rotate a drive wheel, thereby rotating the shaft with respect to the sprung portion. The shaft rotates a low mass disc mounted on it having a number of coded openings formed in it and interposed between signal producing and signal receiving means. A signal beam is passed through selected coded openings to provide an electrical signal corresponding to an increment of the deflection in the surface which is transmitted to particular tabulating and accumulating means corresponding to said increments.

15 Claims, 7 Drawing Figures

PATENTED JUN 10 1975 3,888,118
SHEET 1
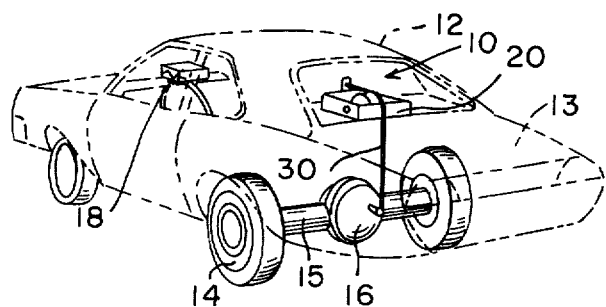
FIG. 1
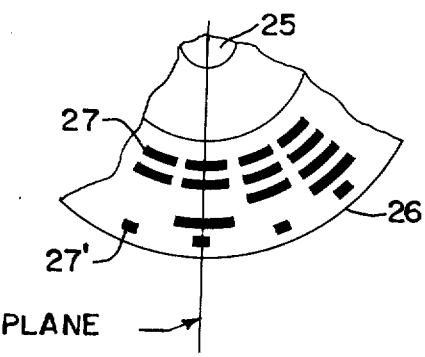
FIG. 7
SENSING PLANE
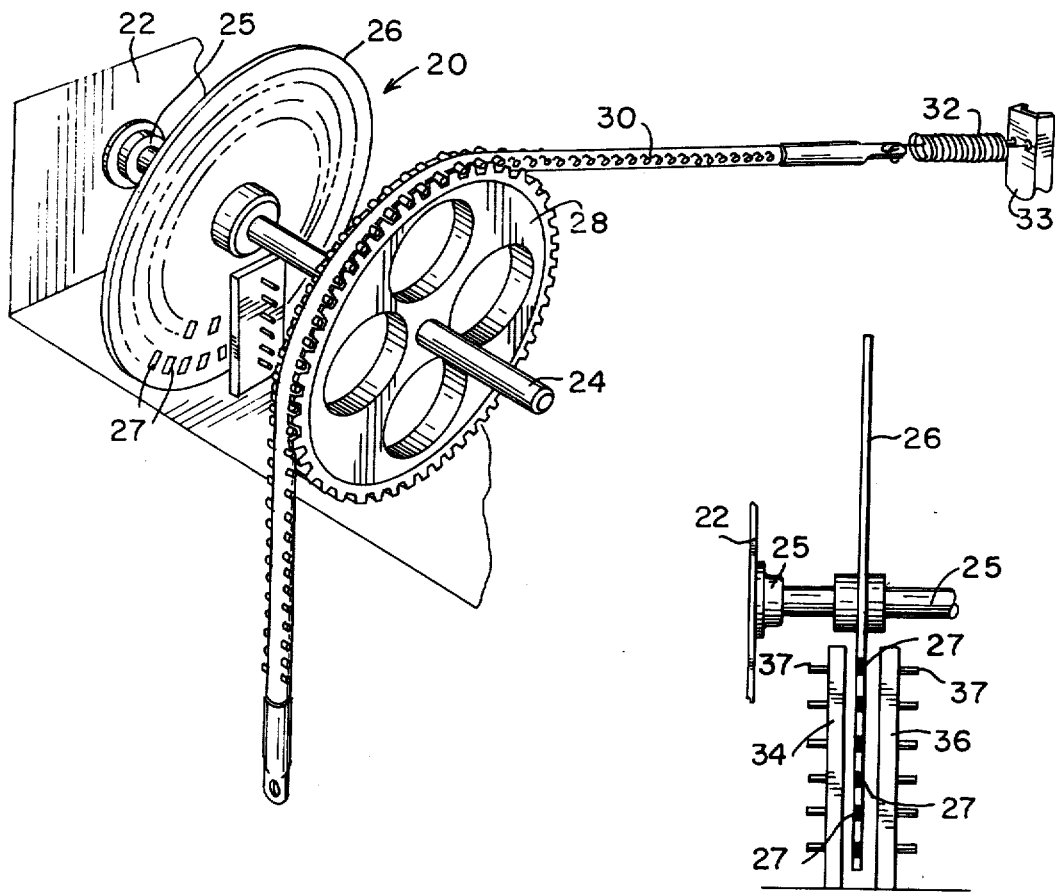
FIG. 2
FIG. 3

PATENTED JUN 10 1975　　　3,888,118

SHEET 2

METHOD AND APPARATUS FOR DETERMINING ROAD ROUGHNESS

BACKGROUND OF THE INVENTION

This invention relates in general to an apparatus and method for testing road surfaces, and, in particular, for measuring the roughness of road surfaces and to give an indicia of road roughness.

The importance of evaluating the relative smoothness or variation in the longitudinal slope of pavement surfaces is well recognized in highway construction and maintenance. Roughness measurements can provide an engineer or survey team with means of evaluating, in detail, the overall pavement performance, comparing various pavements, overlay thicknesses and the riding qualities of various wearing courses. They also provide a means of detecting trouble areas and deteriorating pavements. In order to obtain such data for evaluation, it is extremely desirable, both from an economic and traffic point of view that the test means be compact, lightweight and easily installed in a vehicle which may move along a heavily traveled highway or heavily used airport runway at a sufficient speed so as not to obstruct traffic, while accumulating complete and accurate data.

An early attempt at rapid measurement of road roughness was made with a device called the American Association of State Highway Officials (AASHO) Profilometer. Later, a device known as the CHLOE Profilometer was developed to provide a less expensive method for measuring slope variances. However, both devices operate at a speed below that of presentday traffic, and, therefore, tests can only be made with an extreme precaution that is costly to the operating agency and hazardous to the traveling public. Moreover, such devices require multiple operating personnel, are expensive to manufacture and are unable to test large mileages of pavement in a short time.

The Portland Cement Association Road Meter was developed to afford a more rapid method of measuring slope variance. The unit consists of a control console installed near the driver of the test vehicle and a heavy-duty switch plate and roller contact mounted on the rear package deck and connected to the rear axle. A steel strand fixed to the axle and mounted over a fixed pulley translates vertical movement to horizontal movement of a roller microswitch attached to the strand. The roller microswitch impinges on the switch plate so that transverse roller movements can be measured in ⅛inch increments plus or minus from a reference standing position of the vehicle. The reference position must be adjusted according to the static load in the vehicle. Output from the contact plate is directed to visual indicators of raod car deviations and often to electric counters having a finite switch time.

An improved version of this PCA road meter has been manufactured and marketed by Soiltest, Inc., and sold under the trademark "WISCONSIN ROAD METER," model number ML-500. The ML-500 incorporates some mechanical and output improvements in the PCA meter but operates, basically, in a similar manner.

Another recent version of a road roughness tester is taught by I. K. Mays in U.S. Pat. No. 3,525,257, issued Aug. 25, 1970. Mays teaches a road meter having a forward control and a trunk-mounted recorder which produces a chart giving a running record of deflections. Mays uses a pulley and cable arrangement connected to the rear axle which reacts to vertical movement of the differential housing with respect to the car body to cause a pen to move left to right, in proportion to the motion, over a paper tape also being driven by the device. Mays also provides for an event marker which causes the recording pen to make a full excursion on the graph in selected areas of the roadway.

All the presently available road roughness meters have several disadvantages. All use primarily mechanical means to produce a record of the deviations in the road surface. The ML-500 uses a switch plate in which a roller contact must move in response to deviations. Mays teaches a complex series of pulleys, sheaves and cables which move a tape with relation to a pen. The use of such complex, interacting mechanical movements often cause imprecise and inaccurate results to be obtained from such road meters because of the extremely high speeds at which a test vehicle must travel to avoid disrupting traffic. Though these meters were designed for optimum speeds of approximately 50 miles per hour, it is clear that on most tollways such a speed would be a hazard. At higher speeds, however, the electro-mechanical counters or moving recorder pens are simply too slow to assume and maintain adequate data.

It has also been found that the transducer mechanisms for translating the vertical deflections to electrical or graphic outputs are also inadequate to cope with the high speeds and the extremely high number of inputs produced. In addition, the primarily mechanical nature of these devices increases probabilities of mechanical breakdown due to the constant movement and vibration to which they are subjected. Finally, many present road testers have encountered, because of their mechanical complexity, high production and repair costs which have severely limited their desirability.

Prior devices also have had problems in maintaining a mechanical zero. It is usually necessary that the prior mechanisms be centered with each use or adjusted depending upon the number of persons in the test vehicle. Despite centering, however, the center point is usually never counted in these road meters. Not only is zero extremely difficult to maintain, therefore, but it also is not accounted for as it is passed over, making data produced inherently inaccurate. Such mechanical inefficiencies were often overlooked if they seemed to provide minimal new data. Such minimal data will no longer satisfy the demands and requirements of the industry, however, or the need for data produced in a form compatible with modern electronic data processing equipment rather than manual calculations. The present invention was developed to meet these demands and needs.

DESCRIPTION OF THE INVENTION

The road roughness testing apparatus and method of the present invention is a product of extensive research and has been developed to obtain precision results and high reliability at reasonable costs through the use of solid state design and a novel, more efficient and precise transducer assembly, and to produce results adaptable for use with present high speed electronic data processing equipment to allow further computer evaluation.

This invention overcomes the problems and disadvantages of the prior art by a transducer assembly having a shaft mounted on a sprung portion of a test vehicle for rotation with respect thereto, which is driven by a positive drive belt moving a drive pulley mounted on the shaft. The drive belt is resiliently connected at one end to the sprung portion of the vehicle and at its opposite end to the differential housing or unsprung portion of the vehicle so that it will be moved to rotate the drive shaft whenvever the unsprung portion is moved with respect to the sprung portion. The drive shaft also has a small low mass disc mounted on it having a number of coded openings formed in it interposed between an array of light emitting diodes and an oppositely disposed array of photo-electric cells. When the coded wheel rotates, changing its angular position, a light beam is passed through a particular arrangement of openings, corresponding to a particular increment of deflection from the desired slope, and received by the photo-electric cells.

This information is fed as an electrical data signal to a console assembly having decoders, counters, storage means and display units formed by integrated circuits and transistors. The console assembly is operated directly from the vehicle's 12 volt negative ground electrical system and receives the information produced by the transducer assembly, decodes it and routes it to a particular one of 24 counterbanks corresponding to the arrangement of openings coded to represent a particular increment of deflection. If desired, the signal may also be instantaneously displayed on a series of 24 light emitting diodes indicating the angular position of the coded wheel, corresponding to the particular increment being recorded. This gives an instantaneous visual indication of the road roughness.

A control means on the console assembly allows the operator to store all the accumulated data from a first run and thereby run a second test while reading out the results from the previous test. Outputs are also available for electronic data processing options. The content of each individual counter may be displayed automatically or manually following a run on a digital panel of the control means.

The construction of the present invention is extremely simple and maintenance free. The coded wheel is mounted on a stainless steel shaft which is positively driven by a geared belt drive and pulley, eliminating slippage and points of high wear. The circuitry is all electronic printed on plugin type circuit boards. The few moving parts eliminate the breakdown and imprecision caused by the complex and relative mechanical movements of the prior art.

The electronic circuitry is capable of counting at rates over several million events per second, which is far greater than necessary, but assures that the counters will follow any deviation instantaneously and faithfully. Thus, the problem of the electro-mechanical counters not being able to keep pace with the speed of the automobile is eliminated. The cumbersome contact plates and roller system or mechanical linkage to a drawing pencil and their attendant problems have been eliminated by use of a highly efficient, much faster, and more accurate diode and photo-electric system. The reliability provided by the small number of precision moving parts and the electronic circuitry is much greater than that previously available since there are fewer parts to wear and the counting is done at a much more rapid rate. The present invention, because of its unique construction, permits the addition of more individual increment counters having a greater capability, to allow proliferation of data, at no additional cost of construction. The electronic circuitry and the storage capacity further provides an output compatable with state-of-the-art data handling accessories such as incremental or digital tape, punch cards and printers and analog recorders of various types, which was not possible with prior devices.

It is also significant that the present invention's capability of counting at least 24 separate increments eliminates the need for exact mechanical zeroing of the counter or the adjustment of the reference point to correspond to the load in the vehicle. Deflections are counted in both directions of the transducer's rotation rather than just a single direction so that zero is always counted to produce a frequency distriction curve in which the zero point will be the point of greatest distribution. This eliminates the zero adjustment necessary in the present devices and the inaccuracy caused by failure to count zero. The low mass disc used as a wheel means also follows road deflections faithfully and accurately.

Accordingly, it is an object of the present invention to provide a road roughness tester of simple, inexpensive construction and capable of functioning accurately and reliably at high turnpike speed over a substantial distance of wearing surface.

It is also an object of this invention to provide a road roughness tester having a transducer assembly which translates deflections sensed in a wearing surface to information fed to a console assembly which sorts the information, displays it, and stores it or transfers it to data processing equipment.

It is another object of this invention to provide a transducer assembly for a road roughness tester, which is capable of operating accurately and reliably at high speeds to translate deflections sensed in the wearing surface to electrical data signals.

It is also another object of this invention to provide a transducer assembly for a road roughness tester having only a single moving element interposed between light emitting and light receiving means to translate vertical deflections to electric pulses at extremely high speeds.

It is a further object of this invention to provide a road roughness tester which eliminates the need for the setting of an exact mechanical zero or reference point.

It is one more object of this invention to provide a road roughness tester which may be adapted for and used with electronic data processing equipment for further evaluation of the data stored.

It is also a further object of this invention to provide a road roughness tester which has a memory unit allowing one test to be preformed while the other test is being displayed or printed out.

It is still another object of this invention to provide a road roughness tester which produces readings on a control console which are easily reduced to a single statistic for correlation with the Slope Variance and Present Serviceability Indexes.

It is still another object of this invention to provide a method of testing for road roughness which allows deflections sensed by means contacting a road wearing surface to be instantaneously and reliably translated by transducer assembly into electrical signals which are decoded, displayed and stored and may be further evaluated by operator controlled electronic control means.

These and other important objects of this invention will become apparent from the following description taken in conjunction with the drawings illustrating a preferred embodiment wherein:

FIG. 1 is a perspective view of the road roughness testing apparatus of this invention shown in mounted position in a typical testing vehicle;

FIG. 2 is a perspective view of the transducer assembly used in the road roughness tester of the present invention;

FIG. 3 is an end elevational view of the encoded wheel means of the transducer assembly shown in FIG. 2;

Figure 6:
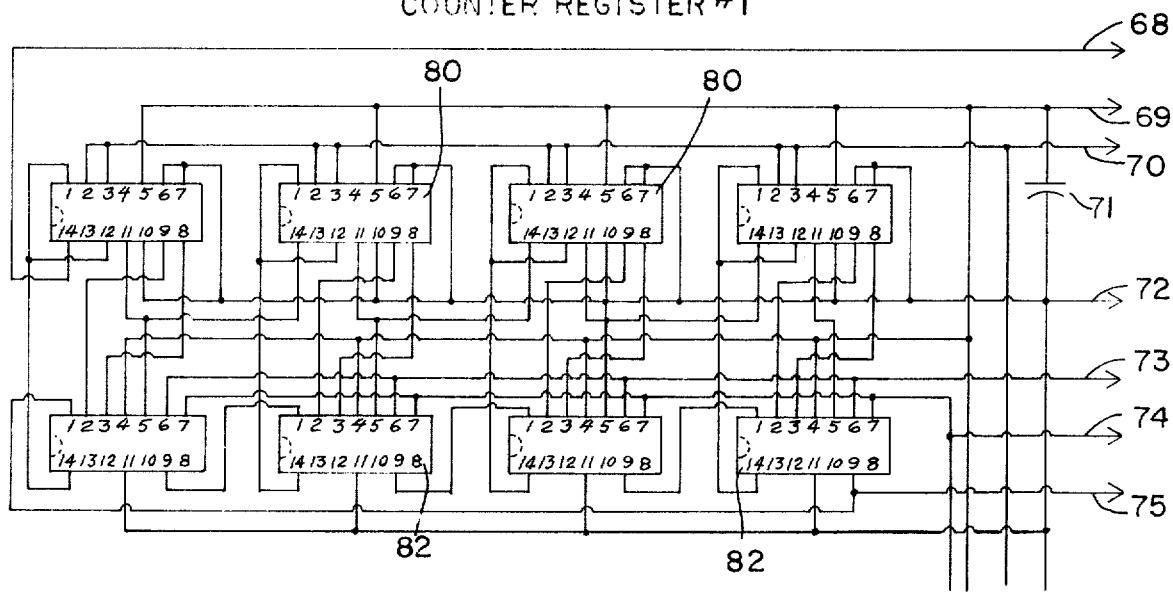
Figure 4:
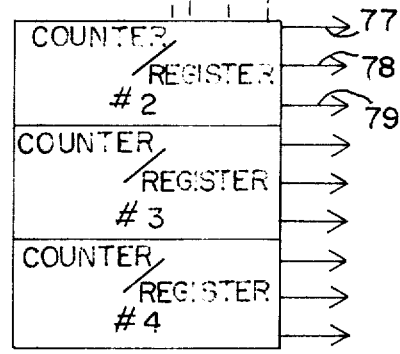
FIG. 4 is a perspective view of the control console assembly, containing the decoder, counter and register means of the present invention.
Figure 4:
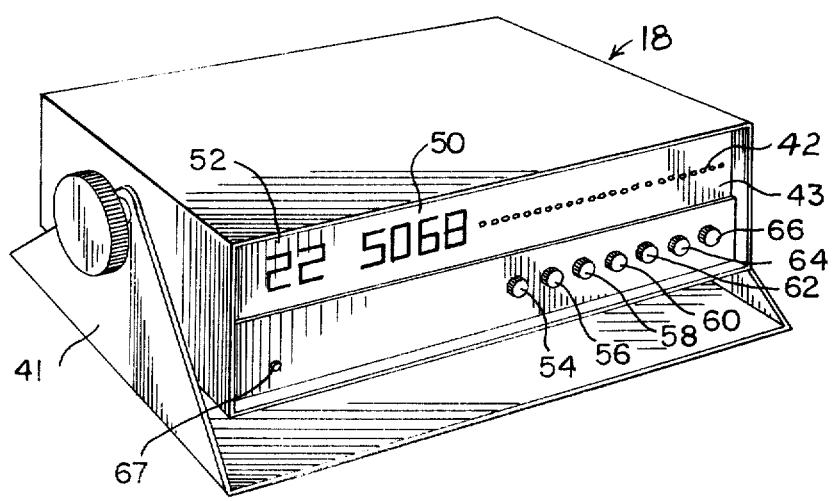
Figure 5:
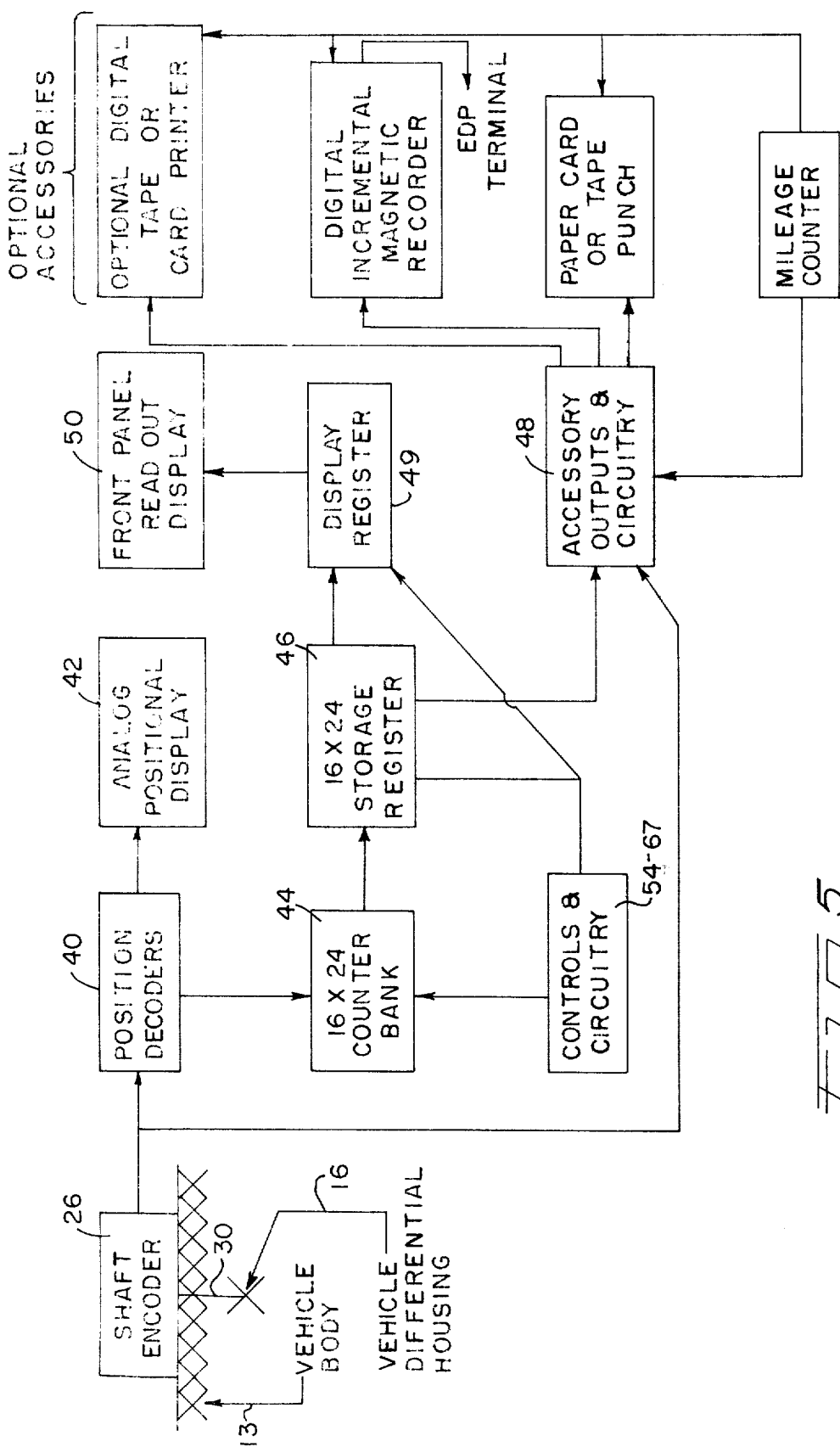

FIG. 5 is a schematic view of one possible arrangement of the elements of the road roughness testing apparatus of this invention showing the flow operation of these elements in performing the method of this invention; and, FIG. 6 is a typical circuit diagram of a counter means and register means used in this invention; and, FIG. 7 is a fragmentary side view of the encoded wheel means of the transducer assembly shown in FIG. 2.

Referring now to the drawings and in particular, to FIG. 1, the roughness tester of this invention is shown in general at 10, positioned in a test vehicle 12 as it would normally be arranged prior to a testing run to determine the roughness of a road wearing surface.

The road roughness tester 10 includes a console assembly 18 for controlling and recording the operation of the tester which is mounted forwardly in the vehicle near the front passenger compartment, and a transducer assembly 20 which is normally mounted on the package shelf near the rear window. The test vehicle 12 has a sprung or body portion 13 and an unsprung portion such as the wheels 14 which directly contact the road wearing surface and sense any deflections in this surface. The wheels are mounted on an unsprung rear axle 15 normally having a differential housing 16.

The transducer assembly portion 20 of this roughness tester 10 is shown in more detail in FIG. 2. In this FIGURE, the transducer assembly 20 is encased in a housing 22, shown in fragmentary view, which is placed directly on the rear package shelf of the vehicle 12. A shaft 24 is pivotally mounted on this housing 22 between its sides for movement with respect to it and the body 13 of the vehicle 12. This stainless steel shaft 24 is preferably mounted in oilless bronze bearings 25 so that it may pivot freely with the minimum possible resistence.

Mounted on the shaft 25 for movement with it with respect to the sprung portion 13 of the vehicle 12 are an encoded wheel 26 and a positive drive pulley 28. The positive drive pulley 28 has a series of teeth about its periphery separated by an internal groove which receives a positive drive belt 30 having a number of lugs along its length which engage these teeth. This drive pulley 28 and drive belt 30 are manufactured by PIC Design Corporation and are designed to prevent any slippage between the belt 30 and the pulley 28 or accidental disengagement of either, which could adversely affect the operation of the present invention. The positive drive pulley 30 is attached at its lower end, as shown in FIGS. 1 and 2, to an unsprung portion of the vehicle 12, such as the differential housing 16 or rear axle 15. It is attached at its opposite, upper end to an extension spring 32 which is, in turn, connected to a post 33 mounted on the sprung portion 13 of the vehicle 12. This extension spring serves to keep the drive belt 30 taut at all times.

As the test vehicle 12 moves over a road wearing surface having a number of deflections, the contact means or wheels 14 and the axle 15 will be moved vertically with respect to the sprung portion 13 of the vehicle, causing a corresponding movement of the belt 30, which, in turn, rotates drive pulley 28 on shaft 24 about the central axis of that shaft. The rotation of the shaft 24 causes the encoded wheel 26 to be rotated about the same axis, the same angular distance as pulley 28.

The encoded wheel 26 is a small low mass metal disc to insure low inertia and immediate response to the rotation of the shaft 24 caused by the deflections in the road wearing surface. This disc 26 has formed in it, a number of coded openings or windows 27 as shown in FIG. 2. While a painted disc made of a material such as plexiglass could also be used, it is preferable to use a disc in which the coded windows 27 are etched completely through the material to prevent the possibility of dust contamination causing a failure of the disc to read properly. The openings 27 which are formed in the disc are mathematically coded to correspond to decimal increments of deflections, each of which equal one-eighth inch of a deflection of the wheels by the road surface. In the preferred embodiment, six openings 27 are used to represent each increment of deflection, but are positioned in 24 different arrangements, each arrangement corresponding to a particular increment of deflection. Each of the 24 incremental arrangements are, therefore, electronically distinguishable from the others so that the signals produced by use of these openings 27, as will be explained in detail below, may be properly classified corresponding to each increment. The 24 coded arrangements on each encoded disc 26 allow a proliferation of data upon each run to produce a great number of data points resulting in an accurate indication of road roughness.

An outer circle of small openings or clock windows 27' are etched about the periphery of disc 26. These outer openings 27' are physically smaller in size than openings 27 and serve to exactly align the openings 27, as will be explained below.

A light emitting diode array 34 and a photoelectric-transistor array 36 are positioned on opposite sides of the encoded wheel 26, as shown in FIG. 3. The light emitting diode array 34 is connected by electric conduit means 37 to a switch on the console 18 which connects it to a source of power, a 5-volt supply in console 18 driven by the 12 volt vehicle battery, (not shown). Similarly, the photoelectric-transistor array 36 is connected by electrical conduit means 37 to the consol means 18 to transmit data corresponding to the road deflections to the console means, as will be shown.

Upon energization of the light emitting diode array 34, by the power supply, a constant beam of light is emitted as a signal from the array toward the adjacent side of the encoded disc 26. The disc 26 acts to block this beam or prevent it from reaching the photoelectric-transistor array 36 on its opposite side, except when an arrangement of coded openings or windows 27 is interposed between the diode 34 and the photoelectric pick-up 36. Thus, as the disc or wheel 26 is rotated on shaft 24, changing its angular position, various arrangements of coded openings 27 are interposed in the path of the light beam produced by the light emitting diodes 34. These windows 27 obviously pass on to the corresponding photoelectric cell-type pick-ups 36, only that portion of the emitted light which corresponds to the particular window arrangment then being interposed. The photoelectric cells 36, being impinged upon by the now coded light beam, sense this beam, amplify it by transistors and transmit it, through electrical conduit 37, to console assembly 18.

The clock windows 27', mentioned above, because of their size, assure that when the light beam is passed through one of them, the disc will be angularly situated so that all remaining encoding openings 27 are in exact centered alignment with their corresponding diode 34 and photoelectric-transistor 36. Such alignment eliminates the ambiguity or noise which would otherwise occur if there were even a slight misalignment of the edges of openings 27 since it causes the related photoelectric-transistors to turn on simultaneously to prevent any false code from being transmitted.

In the console assembly 18, the electrical signal or output from the photoelectric-transistor array 36 is first transmitted into position decoders 40, as shown in FIG. 5. The position decoders 40 accomplish two things. They convert the electrical output corresponding to road deflections to an analog positional display visible on a front panel 43 of the consol assembly 18, which allows the operator to see the relative angular position of the encoded wheel 26, i.e., the angular distance through which the wheel has been rotated due to a particular deflection. The decoder 40 also sends a similar electrical signal to a particular one of a series of individual counterbanks 44 corresponding to each particular ⅛ inch increment of deflection through which the encoded wheel 26 has rotated. In this manner, a counter 44 receives one count each time its corresponding arrangement of openings 27 in the encoded wheel 26 allows light in the form of that arrangement to reach the photo transistor 36.

There are preferably twenty-four counters 44, or one corresponding to each ⅛ inch of road deflection represented by each arrangement of openings 27 on the encoded wheel 26. The counts accumulated in the counterbanks 44 will represent the total number of times that each ⅛ inch increment is crossed. Thus, the counter at the center of the range (null) will have the maximum number of counts, while the counters above and below that center will have a progressively lower total. Therefore, if the points representing the total count of all 24 counters for a single run are plotted on a line graph having $x$ and $y$ coordinate axes, the curve drawn will be a frequency distribution curve representing, in raw form, the serviceability index of the roadway.

Since it is desirable to have the capability of running consecutive tests, the roughness tester has a storage feature which, on command from the operator, is able to store all data accumulated in the counters 44. When this data is stored, the counters 44 may be freed to accumulate data from a new test run. These storage registers are indicated by numeral 46 in FIG. 5. There are 24 such registers, or one corresponding to each of the counters 44. Upon a series of signals controlled by the operator, the information stored in the counters 44 is automatically transferred to the storage registers 46 and the counters 44 cleared to receive new data from the position decoders 40. During the time that the second test is being run, the data in the storage registers 46 is transferred to the display registers 49 for readout on the front panel 43 of the console assembly 18.

The console assembly 18 is pivotally mounted on a stand 41 so that its front panel 43 may be swung toward the operator for easy reading. The front panel 43 of console assembly 18 contains a number of activating switches to control or regulate the test run or the output of the data collected. Numeral 54 refers to a power switch which supplies power to the console assembly 18 and also the light emitting diodes 34 and photoelectric transistor array 36. A count hold switch 56 allows the operator to stop incoming counts at the end of a test run so that the counters 44 will hold counts only for the desired run length. In this way, the roughness tester 10 is able to store data for two complete survey runs; one in the storage registers 46 and the other in the counters 44.

The scan mode selector switch 58 allows the operator to choose between manual scanning of the storage registers 46 and automatic scanning. In the manual mode, when a manual scan switch 62 is depressed, the scanner moves to the next higher counter address at which time the total count on that particular counter 44 is displayed on the front panel 43 at the counter display 50. Numeral 52 is the address of the particular counter or register whose total counts are being displayed. In the automatic mode, on the other hand, the scanner sequence is automatic, and the new address, as well as the contents of the counter/register at that address are displayed for a short period of time after which the next address and its new count is displayed.

The scan rate selector switch 60 offers a choice of fast or slow scanning rates. The slow rate would normally be used for manual recording of counter content and fast scan rate when the operator wishes to move to another counter address rapidly. The counter reset switch 64 resets all counters 44 to zero at the beginning of a test run so new data can be counted. The memory load switch 66 transfers all data in the counters 44 to the storage registers 46 at the end of a run.

A lamp test switch 67 may also be provided to verify the readout of the counter address display 52, since a defective indicator could cause erroneous readings. When this switch is depressed, FIG. 8s will be displayed on all of the six-digit positions.

FIG. 6 is a typical schematic diagram of the electric circuitry of one of the counters 44 and storage registers 46 shown in FIG. 5. Although 24 counter and register banks are used, they are identical, as indicated by the blocks in the lower right-hand portion of the Figure, and, therefore, only one is shown in detail and will be described. Although the counters 44 and the storage registers 46 have been indicated separately in FIG. 5, each counter 44 has a particular storage register 46 associated with it, as shown in FIG. 6. Each counter 44 preferably consists of four integrated circuits 80 which act as decade counters to accumulate impulses from the position decoder 40. These circuits 80 receive an impulse through an input lead 68, register it as a count, and, upon command, put out this total count data, in parallel, to a storage register 46 which consists of a second row of four integrated circuits 82. Similarly, data is put out of the storage register 46, upon command, for transfer to electronic data processing equipment and the like, shown in general at 48 in FIG. 5, through lead 75. Lead 69 identifies a 5-volt supply buss, 70, is a reset buss, 72 is a ground buss, 73 is the mode select lead, and 74 is a clock buss. Capacitor 71 shown in the circuit is preferably a 1/10 microfarad capacitance.

Similarly, the other counter/registers have data input leads shown at 77, mode selector leads 78 and data out leads such as 79.

To briefly describe the operation of the roughness tester, reference is made to FIG. 5. As the test vehicle 12 is moved over a road wearing surface, its unsprung rear axle 15 and differential housing 16 is moved by the wheels 14, which contact the road surface, up and down due to the sensed deflections in the road surface. This vertical movement causes movement of the drive belt 30 and resulting rotating movement of the drive pulley 28 and encoded disc 26 about the central axis of the shaft 24, thereby translating the vertical motion into angular movement. With the power switch 54 of the system on, power is supplied to the light emitting diodes 34. As the disc 26 rotates through an angular distance corresponding to the vertical deflection, a series of etched out openings or windows 27 in the disc 26 are interposed in the light beam emitted by the light emitting diodes 34. Patterns of light are tranmitted by particular arrangements of openings 27, each corresponding to an increment of a vertical deflection, and impinge upon the photoelectric-transistor array 36 disposed on the opposite side of the encoded disc 26 from the light emitting diodes 34.

The photoelectric pickup, which preferably operates in the narrow infra-red spectrum, converts the infra-red beam from diodes 34 into an electrical impulse signal and its transistors amplify and transmit it to the position decoders 40. The position decoders send this electrical signal to the analog positional display 42, consisting of 24 light emitting diodes positioned on the front panel 43 of the console assembly 18. This display 42 indicates immediately the angular position of the encoded disc 26 by showing the particular opening 27 to which the wheel has been moved. This gives an instantaneous indication of the deflection in the road sensed.

The position decoders 40 also transmit a similar electrical signal to the bank of counters 44. Since there is a counter 44 which corresponds to each particular arrangement of openings 27, the proper counter 44 corresponding to the signal receives the signal and registers one count for that increment which has been passed by the wheel 26. The counters 44 are in electrical communication with the controls and circuitry on the front panel 43 of the console assembly 18, as has been previously explained. The memory load switch 66 on this front panel, when activated, loads all of the accumulated counts in the several counters 44 into the storage registers 46 for transfer to the display register 49 or to the accessory outputs 48. The count data will remain in counters 44 due to a recirculation circuit shown in FIG. 6 to be removed only when reset 64 is depressed.

FIG. 5 shows the information contained in the storage registers 46 being transferred to accessory output circuitry such as digital tape or card printers, incremental magnetic recorders, paper card or tape punches and correlated with a mileage counter in each of the systems.

The encoded disc 26 may be manufactured from any suitable material which is of low mass so that it follows road deflections faithfully, such as steel alloys or aluminum. The electronics of the roughness tester is all of solid state design, including the counters, using integrated circuits and silicon transistors throughout to make the unit small in size, lightweight and easy to maintain. All the circuitry is on industrial grade glass epoxy circuit boards of the plug-in type.

As mentioned previously, the unit has a capacity of counting 24 separate 1/8 inch increments thereby eliminating the need for setting an exact zero. The two highest reading channels on the frequency distribution curve will determine the zero point. Since the zero point is the high point in the distribution curve, the tester will automatically compensate for the load in the automobile by automatically adjusting the zero point. No adjustment of zero is necessary as long as the disc 26, in its initial position, is set to count several increments in either direction of rotation. Preferably, the number of deviations shown from the midpoint should be approximately the same.

This roughness tester may be installed in any standard passenger automobile having sprung and unsprung portions. It measures pavement roughness by measuring the movement of the test vehicle rear axle or differential in relation to the vehicle chassis. The unit measures, in 1/8 inch increments, the number and magnitude of movement between the center point of the rear axle and the chassis. These movements are counted in the control console and are then displayed digitally. The console readings are easily reduced to a statistic that may be correlated with the slope variance and present serviceability indexes as determined by the Chloe Profilometer.

While the invention has been described in relation to a preferred embodiment thereof, it will be obvious to those skilled in the art that the structure and electronics are capable of wide variation without departing from the principles of the invention.

I claim:

1. A transducer assembly particularly adapted for use in a road roughness meter to translate deflections sensed in a vehicle supporting surface to signals indicating road roughness including axial means mounted on the sprung portion of a vehicle constructed for travel over said supporting surface, said axial means being angularly movable with respect to said sprung portion, transducer means mounted on said axial means and movable therewith, signal emitting and signal receiving means disposed adjacent said transducer means, drive means operatively engaging at least a portion of said transducer means, said drive means being connected to the unsprung portion of said vehicle at one end thereof, and being connected through resilient means to the sprung portion of said vehicle at the opposite end thereof, said drive means being moved with respect to the sprung portion of said vehicle as said unsprung portion moves in response to the deflections in the vehicle supporting surface, such movement of said drive means angularly moving said transducer means on movement of said axial means relative to said sprung portion of said vehicle and said signal emitting and signal receiving means such that the movement of said transducer means by said drive means causes signals corresponding to the degree of each deflection in said vehicle supporting surface to be received by said signal receiving means, said transducer means including an encoded wheel means mounted on said axial means and angularly movable therewith, said wheel means having a plurality of coded openings formed therein corresponding to measureable increments of possible deflections in said vehicle supporting surface, said encoded wheel means being interposed between said signal emitting means and said signal receiving means, said encoded wheel means also having a series of aligning openings formed therein, said aligning openings being smaller in dimension than said coded openings and being disposed in spaced relationship near the perimeter of said wheel means such that angular movement of said wheel means to allow a signal to be passed from said signal emitting means through one of said aligning openings in said wheel means to said signal receiving means will assure that various desired coded openings are in centered alignment between said signal emitting means and signal receiving means.

2. A transducer assembly particularly adapted for use in a road roughness meter to translate deflections sensed in a vehicle supporting surface to signals indicating road roughness including axial means mounted on the sprung portion of a vehicle constructed for travel over said supporting surface, said axial means being angularly movable with respect to said sprung portion, transducer means mounted on said axial means and movable therewith, signal emitting and signal receiving means disposed adjacent said transducer means, drive means operatively engaging at least a portion of said transducer means, said drive means being connected to the unsprung portion of said vehicle at one end thereof, and being connected through resilient means to the sprung portion of said vehicle at the opposite end thereof, said drive means being moved with respect to the sprung portion of said vehicle as said unsprung portion moves in response to the deflections in the vehicles supporting surface, such movement of said drive means angularly moving said transducer means on movement of said axial means relative to said sprung portion of said vehicle and said signal emitting and signal receiving means such that the movement of said transducer means by said drive means causes signals corresponding to the degree of each deflection in said vehicle supporting surface to be received by said signal receiving means, said transducer means including an annular drive pulley means and encoded wheel means mounted in spaced relationship on said axial means and movable therewith, said wheel means having a plurality of coded openings formed therein corresponding to measurable increments of possible deflections in said vehicle supporting surface, said encoded wheel means being interposed between said signal emitting means and said signal receiving means such that movement of said wheel means allows signals to be passed from said signal emitting means through various ones of said coded openings in said wheel means to said signal receiving means according to the number of measuralbe increments in the dimension of the deflection sensed, said signal emitting means including an array of light emitting diodes disposed on one side of said wheel means, and said signal receiving means including an array of photoelectric cells disposed on an opposite side of said wheel means, such that movement of said wheel means allows light signals produced by said diodes to be passed through various ones of said openings interposed between said diodes and said cells and to be received by said photoelectric cells, such signals being passed through particular openings coded to correspond to particular measurable increments of deflection of said vehicle supporting surface as sensed by said road roughness meter.

3. The transducer assembly of claim 2 wherein said wheel means is a small size, low mass disc having small openings formed therein, said openings being coded by their arrangement to correspond to increments of deflection from a desired smooth surface.

4. In a road roughness tester particularly adapted to a sense deflections in a vehicle supporting surface and translate them to data signals indicating road roughness, and including a testing vehicle constructed for travel over the supporting surface and having an unsprung portion in contact with the supporting surface and a sprung portion, and control and recording means for visibly displaying and/or storing the data signals, the improvement comprising a transducer assembly for translating the vertical movement of said unsprung portion relative to said sprung portion to data signals, said transducer assembly including shaft means mounted on the sprung portion of said vehicle, said shaft means being angularly movable with respect to said sprung portion, annular transducer means mounted on said shaft means and movable therewith, signal emitting and signal receiving means disposed adjacent said transducer means, drive means operatively engaging at least a portion of said transducer means, said drive means being connected to the unsprung portion of said vehicle at one end thereof and being connected through resilient means to the sprung portion of said vehicle at the opposite end thereof, said drive means being moved with respect to the sprung portion of said vehicle as said unsprung portion moves in response to the deflections in the supporting surface, such movement of said drive means causing angular movement of said transducer means with said shaft means with respect to said sprung portion of said vehicle and said signal emitting and signal receiving means, such that the movement of said transducer means by said drive means causes signals corresponding to the deflections in said vehicle supporting surface to be received by said signal receiving means, said transducer means including an encoded wheel means mounted on said axial means and angularly movable therewith, said wheel means having a plurality of coded openings formed therein corresponding to measurable increments of possible deflections in said vehicle supporting surface, said encoded wheel means being interposed between said signal emitting means and said signal receiving means, said encoded wheel means also having a series of aligning openings formed therein, said aligning openings being smaller in dimension than said coded openings and being disposed in spaced relationship near the perimeter of said wheel means such that angular movement of said wheel means to allow a signal to be passed from said signal emitting means through one of said aligning openings in said wheel means to said signal receiving means will assure that various desired coded openings are in centered alignment between said signal emitting means and signal receiving means.

5. In a road roughness tester particularly adapted to sense deflections in a vehicle supporting surfact and translate them to data signals indicating road roughness, and including a testing vehicle constructed for travel over the supporting surface and having an unsprung portion in contact with the supporting surface and a sprung portion, and control and recording means for visibly displaying and/or storing the data signals, the improvement comprising a transducer assembly for translating the vertical movement of said unsprung portion relative to said sprung portion to data signals, said transducer assembly including shaft means mounted on the sprung portion of said vehicle, said shaft means being angularly movable with respect to said sprung portion, annular transducer means mounted on said shaft means and movable therewith, signal emitting and signal receiving means disposed adjacent said transducer means, drive means operatively engaging at least a portion of said transducer means, said drive means being connected to the unsprung portion of said vehicle at one end thereof and being connected through resilient means to the sprung portion of said vehicle at the opposite end thereof, said drive means being moved with respect to the sprung portion of said vehicle as said unsprung portion moves in response to the deflections in the supporting surface, such movement of said drive means causing angular movement of said transducer means with said shaft means with respect to said sprung portion of said vehicle and said signal emitting and signal receiving means, such that the movement of said transducer means by said drive means causes signals corresponding to the deflections in said vehicle supporting surface to be received by said signal receiving means, said annular transducer means including drive pulley means and encoded wheel means mounted in spaced relationship on said shaft means and movable therewith, said wheel means having a plurality of coded openings formed therein corresponding to measurable increments of possible deflections in said vehicle supporting surface, said encoded wheel means being interposed between said signal emitting means and said signal receiving means such that the movement of said wheel means allows signals to be passed from said signal emitting means through various ones of said coded openings in said wheel means to said signal receiving means according to the number of measurable increments in the dimension of the deflection sensed, said signal emitting means including an array of light emitting diodes disposed on one side of said wheel means, and said signal receiving means including an array of photoelectric cells disposed on an opposite side of said wheel means, such that movement of said wheel means allows light signals produced by said diodes to be passed through various ones of said openings interposed between said diodes and said cells and to be received by said photoelectric cells, such signals being passed through particular openings coded to correspond to particular measurable increments of deflection of said vehicle supporting surface as sensed by said road roughness meter.

6. The transducer assembly of claim 5 wherein said wheel means is a small size, low mass disc having small openings formed therein, said openings being coded by their arrangment to correspond to increments of deflection from a desired smooth surface.

7. A road roughness tester indicating roughness due to surface deflections in a vehicle supporting surface including a transducer assembly mounted on a sprung portion of a vehicle moving over the supporting surface, an angularly movable portion of said transducer assembly being connected to the unsprung portion of the vehicle, decoder means in electrical communication with said transducer assembly and receiving data signals corresponding to the degree of each surface deflection transmitted by said transducer assembly, said decoder acting to sort said signals, according to measurable increments of the deflections sensed, counter means in electrical communication with said decoder means to count and accumulate the signals received from said decoder means, display means in electrical communication with said decoder means to display said data signals received from said decoder means and indicate the angular position of said angularly movable portion of said transducer assembly, register means in electrical communication with said counter means to receive, upon activation, said data signals accumulated in said counter means over a desired distance of vehicle supporting surface and to permit the readout of said data as information indicating road roughness, and control means to allow the operator to control the accumulation, storage and display of the data signals, said counter means and said storage means being operable by said control means to allow data signals from a first test run to be transferred out of said storage means while data signals from a second test run are being accumulated in said counter means.

8. The road roughness tester of claim 7 including, in addition, data handling means in electrical communication with said register means to receive data accumulated and stored in said register means thereby allowing such data to be permanently recorded by digital or analog recorders, punched out on cards or tape, or printed out for future use and evaluation.

9. The road roughness tester of claim 7 including, in addition, data handling means in electrical communication directly with said decoder means to allow data to be directly recorded by digital or analog recorders, punched out on cards or tape, or printed out for future use and evaluation.

10. The road roughness tester of claim 7 wherein said transducer assembly includes a drive pulley means and an encoded wheel means mounted in spaced relationship on shaft means mounted on said sprung portion of said vehicle and angularly movable with said shaft means, said wheel means having a plurality of coded openings formed therein arranged corresponding to measurable increments of possible deflections in said vehicle supporting surface, said coded wheel means being interposed between a signal emitting means and a signal receiving means such that movement of said wheel means allows signals to be passed from said signal emitting means through various ones of said coded openings in said wheel means to said signal receiving means according to the number of measurable increments in the dimension of the deflection sensed, said signal receiving means thereupon transmitting data signals identifying coded positions on said wheel means corresponding to said increments of said deflection sensed.

11. The road roughness tester of claim 7 wherein said decoder means converts the data signals received from said transducer assembly and corresponding to incremental deflections of said supporting surface to analog positional displays on said display means, thereby allowing the operator to see the relative angular position of the rotatable portion of said transducer assembly, said decoder means also transmitting a data signal to a particular one of a plurality of said counter means which corresponds to the coded position of said rotatable portion of said transducer assembly responsible for producing that particular data signal.

12. The road roughness tester of claim 7 wherein said counter means includes a plurality of counterbanks each identifying a coded position on said angularly movable portion of said transducer assembly corresponding to increments of deflection sensed in the vehicle supporting surface.

13. A method of measuring the surface deflection of a vehicle supporting surface to obtain an indication of road roughness including the steps of:
moving a contact means over said supporting surface;
transmitting the vertical motion of said contact means caused by the degree of each deflection of said supporting surface to a transducer assembly means;
translating the vertical displacement of said contact means corresponding to said deflections to electrical impulses representing increments of deflection through angular movement of a portion of said transducer assembly means;
transmitting said electrical impulses to a decoder means;
transmitting said electrical impulses from said decoder means to display means to show the relative angular position of said portion of said transducer assembly means; and,
also transmitting said electrical impulses from said decoder means to selected counter means to count and accumulate said impulses as data in said counter means, said electrical impulses being distributed by said decoder means to selected counter means corresponding to particular increments of surface deflection identified by the angular position of said portion of said transducer assembly means.

14. The method set forth in claim 13 including the additional step of transmitting the sorted impulses accumulated in said counter means to register means, upon command, said register means receiving said impulses to permit the readout of said impulses as data indicating road roughness, said counter means retaining said accumulated impulses, or alternatively, being cleared of all said accumulated impulses to allow the recording of impulses from a second run in said counter means.

15. The method of claim 13 including the additional step of transferring the sorted impulses accumulated in said register means to data handling means in electrical communication with said register means to allow said impulses to be recorded as data information by digital or analog recorders, punched out on cards or printed out for future use and evaluation in determining road roughness.

* * * * *